Jan. 17, 1956   G. A. FRICKER ET AL   2,731,180
FISH STRINGER
Filed June 10, 1953
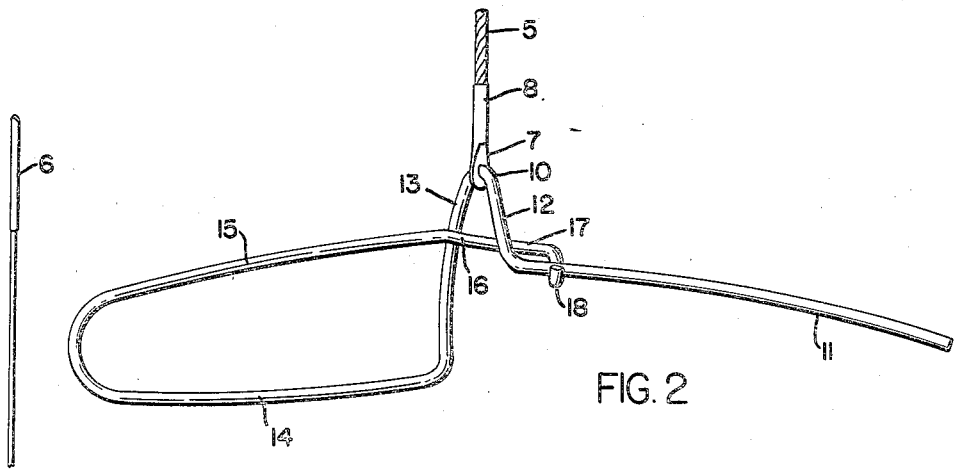
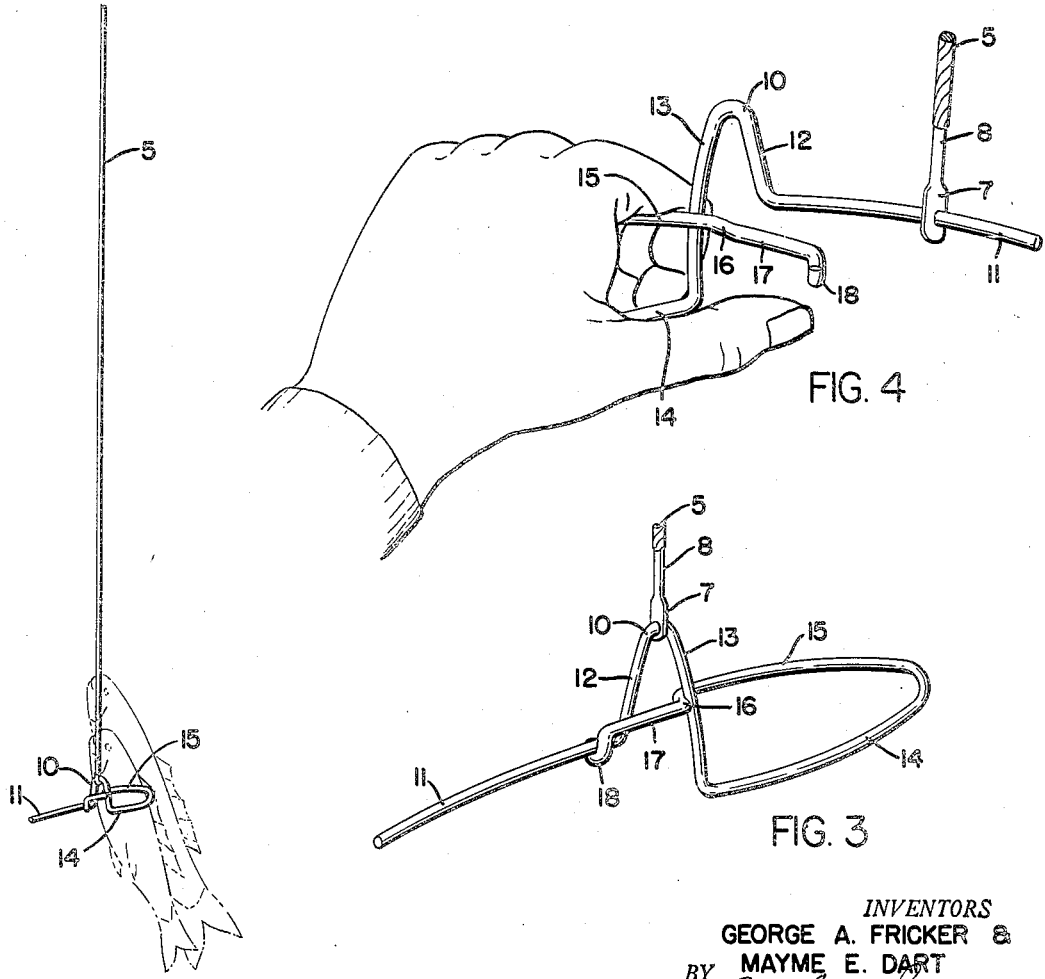
FIG. 2
FIG. 4
FIG. 3
FIG. 1
*INVENTORS*
GEORGE A. FRICKER &
BY  MAYME E. DART
ATTORNEYS United States Patent Office 2,731,180
Patented Jan. 17, 1956

2,731,180

FISH STRINGER

George A. Fricker and Mayme E. Dart, Akron, Ohio

Application June 10, 1953, Serial No. 360,642

4 Claims. (Cl. 224—7)

The invention relates generally to a fish stringing line for retaining and carrying a catch of fish, and more particularly to a fish stringer from which the fish can be quickly and easily removed.

The ordinary fish stringer consists of a line with a stop or abutment attached to one end, the other end being passed through one gill and the mouth of each fish so that the lowermost fish is held on the line by the stop and each successive fish rests against the one next below. The stop must be securely attached to the line to avoid losing the fish, particularly when the line is immersed for long periods in the water alongside of a boat in order to keep the fish alive and fresh.

If the line is tied to the stop, it becomes very difficult to untie after having been immersed in water, and consequently when it is desired to remove the fish they must be removed one at a time by pulling them upwardly over the upper end of the line. This is an awkward and tedious operation, particularly because the inner edges of the gills are rough and tend to catch on the line as they are pulled upwardly thereover. Various attempts have been made to provide a detachable stop but these have resulted in a construction which is relatively expensive and complicated, or cumbersome in operation, or both.

It is an object of the present invention to provide a novel fish stringer which has a minimum number of parts, is extremely simple and inexpensive to make, and which overcomes the disadvantages of prior constructions.

Another object is to provide a novel fish stringer having a cross bar mounted on one end for quick and easy detachment when desired, without requiring any special skill and without the aid of tools.

These and other objects are accomplished by the parts, combinations and arrangements comprising the present invention, a preferred embodiment of which is shown by way of example in the accompanying drawing and described in detail herein. Various modifications and changes in details of construction may be made within the scope of the invention as defined in the appended claims.

Referring to the drawing:

Fig. 1 is a general elevational view showing the manner of using the novel stringer for retaining a catch of fish;

Fig. 2 is an enlarged elevational view of the cross bar attached to the lower end of the stringing line.

Fig. 3 is a perspective view thereof; and

Fig. 4 is a view showing the manner of removing the cross bar from the line.

In the drawing the fish stringing line is shown at 5, and may consist of ordinary strong cord of substantial diameter, say ⅛ inch, so as not to cut through the mouth or gills of the fish strung on the line. One end of the line 5 perferably has a needle 6 thereon for facilitating stringing the fish on the line. This needle may be a slit tube of metal or plastic material, one end of which is pinched or squeezed around the cord to securely fasten the needle thereto.

The other end of the line preferably has secured thereon an eyelet 7 of the moldable material, such as soft metal or plastic, which has a slit tubular portion 8 squeezed or pinched around the end of the cord to secure it to the eyelet. By utilizing such an eyelet, the tubular portion 8 may be squeezed tightly around the end of the cord so as to form a smooth extension of the single strand for facilitating removal of the fish from the line, as distinguished from forming an attaching loop in the line which presents a double strand tending to catch on the mouth and gills when the fish are removed.

The novel cross bar preferably consists of a single piece of resilient wire having a hump portion 10 at its central portion normally extending through the eyelet, as shown in Figs. 2 and 3, so that the cross bar is suspended by the line and acts as a stop for holding fish on the line, as shown in Fig. 1. A single bar 11 extends laterally from one arm 12 of the hump 10 and may be substantially straight and smooth as shown for facilitating removal of the eyelet 7, as shown in Fig. 4.

The other arm 13 of the hump 10 preferably extends downwardly and then laterally to form the lower leg 14 of a loop of a size to be squeezed bodily in one's hand as shown in Fig. 4, the upper leg 15 of which loop returns to and crosses in front of the arm 13 as viewed in Figs. 2 and 3. The upper leg 15 preferably has an offset 16 engaging around arm 13 and a substantially straight portion 17 extends from the offset through the hump and behind the arm 12 of the hump. A downwardly angled upturned hook 18 is provided on the end of portion 17 for engaging under the bar 11 adjacent to arm 12 of the hump. The resiliency of the loop urges the upper leg upwardly and holds the hook 18 is engagement with the bar 11.

In using the novel stringer, the lower end of the line 5 is attached to the cross bar by squeezing the loop thereof in the hand, as shown in Fig. 4, to allow the eyelet 7 to be passed over the bar 11 to the hump 10. As each fish is caught, the fisherman strings it on the line by passing the needle 6 through one gill and the mouth of the fish and slides the fish down along the line until it contacts the cross bar, after which the stringer is perferably hung from the side of the boat in the water.

When it is desired to remove and clean the fish, the stringer may be held over or placed in a sink or other receptacle in which the fish are to be cleaned, and by grasping and squeezing the loop of the cross bar the eyelet is quickly and easily detached, whereupon merely lifting the upper end of the line will cause the fish instantly to slide off the line and over the eyelet into the receptacle. The fish slide off the line in the same direction they were put on, so that there is no tendency for the gills to catch on the line, and the smooth shank of the eyelet continuing evenly from the diameter of the cord offers no obstruction.

The novel fish stringer of the present invention is simple and inexpensive because it has a one-piece wire cross bar, which is quickly and easily attached to and detached from the stringing line, without requiring skill or tools, so that a string of fish is securely held under any and all conditions, but may be instantaneously removed whenever desired.

The advantages of the present invention will be apparent from the foregoing description, and it will also be apparent that various changes may be made in the construction of the embodiment shown and described by way of example, while still retaining the advantages, without departing from the scope of the invention defined in the following claims.

What is claimed is:

1. In a fish stringer having a line with an eyelet on one end, a cross bar adapted to be removably attached to said eyelet, said cross bar consisting of a single piece of resilient wire having a substantially straight bar on one side and a loop on the other side, a central hump for extending through said eyelet and connecting said bar with one leg of said loop, and the other leg of the loop extending through said hump and terminating in an angular hook resiliently engaging under said bar adjacent to said hump.

2. In a fish stringer having a stringing line with an eyelet on one end, a wire cross bar having a central hump portion for extending through said eyelet, said cross bar including a substantially straight single bar extending laterally from one side of the hump and a loop extending laterally from the other side, the return leg of the loop crossing the other leg and terminating in an angular hook resiliently engaging under said single bar adjacent to said hump, and said loop being of a size to be squeezed bodily in one's hand.

3. In a fish stringer having a stringing line with an eyelet on one end, a wire cross bar having a central hump portion for extending through said eyelet, said cross bar including a substantially straight single bar extending laterally from one side of the hump and a loop extending laterally from the other side, said loop being disposed in a vertical plane when suspended from the line, and the upper leg of said loop crossing said hump portion terminating in a hook resiliently engaging under said single bar, and the lop being of a size to be squeezed bodily in one's hand.

4. A fish stringer including a cord having an eyelet secured on one end in smooth continuation of one strand of said cord, a wire cross bar having a central hump portion for extending through said eyelet, said cross bar including a substantially straight single bar extending laterally from one side of the hump and a loop extending laterally from the other side, and the return leg of said loop crossing the hump and terminating in a hook resiliently engaging under said single bar.

References Cited in the file of this patent

UNITED STATES PATENTS

| | | |
|---|---|---|
| 198,813 | Perrin | Jan. 1, 1878 |
| 927,840 | Dineen | July 13, 1909 |
| 2,062,386 | Withey | Dec. 1, 1936 |
| 2,517,761 | Boyer | Aug. 8, 1950 |